(12) United States Patent
Manderla et al.

(10) Patent No.: US 11,271,502 B2
(45) Date of Patent: Mar. 8, 2022

(54) METHOD FOR CONTROLLING AN ELECTRIC MACHINE, CONTROL DEVICE FOR AN ELECTRIC MACHINE AND ELECTRIC DRIVE SYSTEM

(71) Applicant: Robert Bosch GmbH, Stuttgart (DE)

(72) Inventors: Maximilian Manderla, Ludwigsburg (DE); Florian Malchow, Stuttgart (DE); Michele Hirsch, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 39 days.

(21) Appl. No.: 16/490,938

(22) PCT Filed: Mar. 2, 2018

(86) PCT No.: PCT/EP2018/055134
§ 371 (c)(1),
(2) Date: Dec. 1, 2019

(87) PCT Pub. No.: WO2018/162335
PCT Pub. Date: Sep. 13, 2018

(65) Prior Publication Data
US 2020/0091848 A1    Mar. 19, 2020

(30) Foreign Application Priority Data
Mar. 7, 2017    (DE) .................. 10 2017 203 697.4

(51) Int. Cl.
*H02P 21/05*    (2006.01)
*H02P 29/50*    (2016.01)

(52) U.S. Cl.
CPC .............. *H02P 21/05* (2013.01); *H02P 29/50* (2016.02)

(58) Field of Classification Search
CPC ............ H02P 6/10; H02P 21/05; H02P 29/50; H02M 1/15
See application file for complete search history.

(56) References Cited

U.S. PATENT DOCUMENTS 8,018,193 B1    9/2011  Pekarek et al.
9,407,162 B2 *  8/2016  Kudoh .............. H02M 7/53873
(Continued)

FOREIGN PATENT DOCUMENTS

DE    102009000930    12/2009
DE    102012107970    2/2013
(Continued)

OTHER PUBLICATIONS

International Search Report for Application No. PCT/EP2018/055134 dated May 7, 2018 (English Translation, 3 pages).
(Continued)

*Primary Examiner* — Said Bouziane
(74) *Attorney, Agent, or Firm* — Michael Best & Friedrich LLP

(57) ABSTRACT

The present invention discloses a control system for an electric machine. In order to control the electric machine, predetermined frequency components are extracted from manipulated variables or measurement variables of the electric machine and are multiplied by a previously calculated control matrix. The control matrix can be calculated in advance here. Different control matrices can be formed in advance for different applications. As a result, simple efficient and robust control of the electric machine is possible, in particular for optimising and minimising harmonics.

10 Claims, 2 Drawing Sheets

(56) References Cited

U.S. PATENT DOCUMENTS

| | | | |
|---|---|---|---|
| 2009/0251096 A1 | 10/2009 | Schulz et al. | |
| 2012/0306411 A1* | 12/2012 | Tadano | H02P 23/04 |
| | | | 318/400.02 |
| 2013/0082636 A1* | 4/2013 | Ohori | H02P 21/00 |
| | | | 318/723 |
| 2015/0066302 A1* | 3/2015 | Yang | B62D 5/0472 |
| | | | 701/42 |
| 2016/0018466 A1* | 1/2016 | Miklosovic | H02P 23/14 |
| | | | 702/182 |
| 2019/0260311 A1* | 8/2019 | Chhabra | H02J 3/383 |

FOREIGN PATENT DOCUMENTS

| | | |
|---|---|---|
| DE | 102011088915 | 6/2013 |
| EP | 2667503 | 11/2013 |

OTHER PUBLICATIONS

Beccue, P. et al., "Compensation for Asymmetries and Misalignment in a Hall-Effect Position Observer Used in PMSM Torque-Ripple Control," IEEE Transactions on Industry Applications, IEEE Service Center, vol. 43, No. 2, Mar. 1, 2007, pp. 560-570.

* cited by examiner

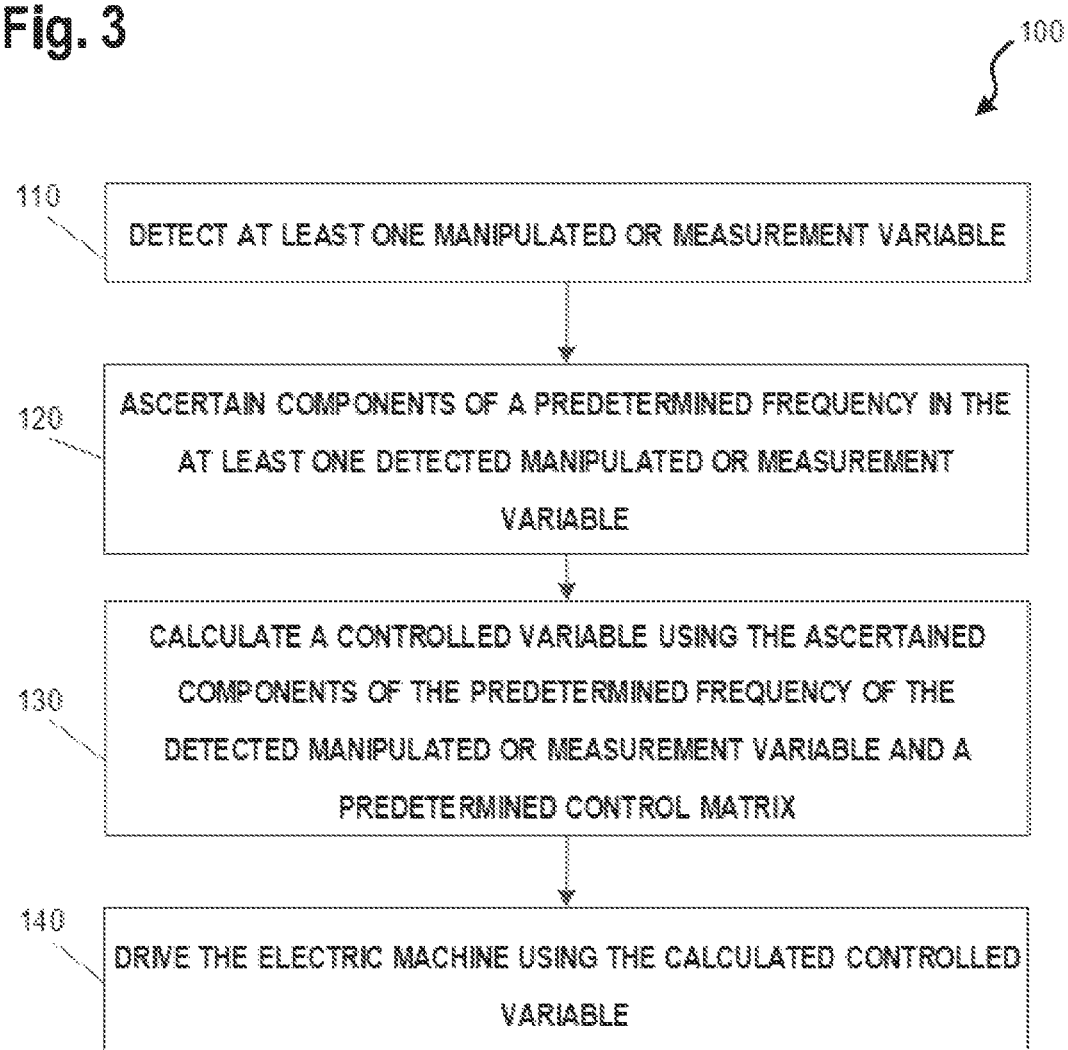

METHOD FOR CONTROLLING AN ELECTRIC MACHINE, CONTROL DEVICE FOR AN ELECTRIC MACHINE AND ELECTRIC DRIVE SYSTEM

BACKGROUND OF THE INVENTION

The present invention relates to a control device for an electric machine, to a method for controlling an electric machine, and to an electric drive system.

The document DE 10 2009 000 930 A1 discloses a method and an arrangement for reducing the torque ripple in a permanent magnet motor system. The motor system comprises a permanent magnet motor coupled to an inverter. The method described in said document comprises a step for modifying operating control signals in order to generate ripple-reducing operating control signals. These modified operating control signals are supplied to an inverter for controlling the permanent magnet motor.

Rotating field machines, such as, for example, squirrel cage asynchronous machines or permanent magnet synchronous machines, owing to their design, do not have ideal sinusoidal flux distributions in the airgap. During operation, this leads to nonuniform torques affected by harmonics during control with sinusoidal currents. Two fundamental approaches are possible for minimizing harmonics. One approach consists in targeted controlled connection of a superposed exogenous compensation voltage to the motor voltage. Alternative approaches are based on an additional control loop. In this case, by way of example, in a cascade structure in an inner control loop firstly a setpoint torque can be predefined, which is subsequently superposed externally by a compensation method for higher harmonics.

SUMMARY OF THE INVENTION

The present invention discloses a method for controlling an electric machine, a control device for an electric machine and an electric drive system.

Accordingly, provision is made of:

a method for controlling an electric machine. The method comprises the steps of detecting at least one manipulated or measurement variable and ascertaining components of a predetermined frequency in the at least one manipulated or measurement variable detected. Furthermore, the method comprises a step for calculating a controlled variable using a predetermined control matrix and using the ascertained components of the predetermined frequency of the detected manipulated or measurement variable. Finally, the method can comprise a step for driving the electric machine using the calculated controlled variable.

Furthermore, provision is made of:

a control device for an electric machine comprising a first transformation unit and a first computing unit. The first transformation unit is designed to ascertain components of a predetermined frequency from at least one manipulated or measurement variable. The first computing unit is designed to calculate a controlled variable using a predetermined control matrix and the ascertained components of the predetermined frequency of the manipulated or measurement variable.

Furthermore, provision is made of:

an electric drive system comprising an electric machine and a control device according to the invention.

The present invention is based on the insight that disturbance variables such as ripple or harmonics, for example, can occur in electric drive systems. Such disturbances can lead to a torque with harmonics for example on account of the structural design. Moreover, by way of example, influencing of electric variables such as, for example, the phase currents for feeding the electric machine or propagation of higher-frequency disturbances via an infeed point of the electrical energy for a drive system is possible. The compensation or minimization of such disturbances requires a complex and in part costly control system.

The present invention is therefore based on the concept of taking account of this insight and providing simple, efficient and robust control for an electric machine. In particular, such control of the electric machine is intended to enable efficient control for minimizing or optimizing disturbances in an electric drive system. A focus here resides in particular in the minimization or compensation of disturbance variables with a frequency of a harmonic of the motor frequency.

For this purpose, provision is made for extracting predetermined frequency components from one or more manipulated or measurement variables of an electric drive system and for calculating a controlled variable by means of a previously calculated control matrix and the ascertained frequency components of the manipulated or measurement variable. Since the control matrix for the calculation of the controlled variable in this case has to be previously ascertained only once, the controlled variable can be determined very simply during operation. Very fast control of an electric drive system can be achieved as a result. In particular, such control also requires a low computation load, with the result that it is possible to have recourse to relatively simple and cost-effective hardware for the realization. The costs for the realization can be reduced as a result.

The predetermined frequency or else optionally a plurality of predetermined frequencies for which the frequency components are extracted from the manipulated or measurement variables can be determined here in particular on the basis of an electric frequency of the electric machine. In particular, for this purpose it is possible to use one or more harmonics of the electric drive system as a basis for ascertaining frequency components. In this way, in particular, influences and disturbances on account of these harmonics in the electric machine and the entire drive system can be optimized and adapted very well.

Manipulated or measurement variables which can be used here for the control of the electric machine can comprise for example variations, in particular harmonics, in a torque profile of the electric machine. Furthermore, fluctuations, in particular influences with frequencies of harmonics, in currents or voltages of the electric machine and respectively of the electric drive system are also possible as manipulated or measurement variables for control according to the invention. Furthermore, further parameters available directly as manipulated or measurement variables or else variables that can be derived indirectly from other manipulated or measurement variables can also be used for the control. In this regard, it is also possible, for example, to predefine parameters for an intended evolution of noise in the electric machine. By means of targeted setting, raising or lowering of frequency components, in particular of harmonics, it is thus possible to influence the evolution of noise in the electric machine and thus the entire drive system. In this way, it is also possible, for example, to raise the evolution of noise in the electric machine in a targeted manner by means of the control. This makes it possible, for example, to direct the attention of a user or a person in the vicinity of the electric machine to a hazard or a possible event.

In accordance with one embodiment, the at least one manipulated or measurement variable comprises a torque or a torque profile of the electric machine, an electric current and/or an electric voltage of the electric machine, and/or a desired evolution of noise in the electric machine. Furthermore, any desired further variables are also possible as manipulated or measurement variables. In particular, such manipulated or measurement variables from which further variables can be derived can also be concomitantly taken into account. Consequently, the control of the electric machine can also be adjusted to predefined values which cannot be directly detected metrologically.

In accordance with one embodiment, in the step for calculating the controlled variable, the method comprises a step for transforming the controlled variable into the time domain. This involves firstly carrying out a calculation by means of control matrix and frequency components of the manipulated or measurement variables in the frequency domain and then transforming the result by means of a transformation into the time domain, such that the controlled variable is subsequently available for control in the time domain.

In accordance with one embodiment, the method comprises a step for providing a plurality of predetermined control matrices. In this case, different control matrices can be provided in particular for different applications. This plurality of control matrices can be calculated in advance here, for example, such that no further calculation of control matrices need be carried out during the control of the electric machine. In this case, by way of example, the control matrices provided can be stored in a memory. Alternatively, providing the control matrices can also comprise for example calculating the control matrices in the computing unit itself. In this case, the required control matrices can optionally also be calculated online, i.e. during operation. Furthermore, the method can comprise a step for selecting a control matrix from the plurality of predetermined control matrices. Afterward, by means of the selected control matrices, the controlled variable can be implemented from the frequency components of the manipulated or measurement variables. In this way, on the basis of the plurality of different control matrices, a suitable, adapted control matrix can be selected in each case for different applications. A simple adaptation of the control for different applications is possible as a result.

In accordance with one embodiment, the control matrix can be selected depending on a predefined operating mode for the electric machine. Such operating modes can take account of a different optimization of parameters, for example. In this regard, by way of example, different control matrices can adapt different components of the harmonics to different degrees. Moreover, a different evolution of noise in the electric machine is possible, for example, on the basis of different control matrices. Furthermore, any desired further optimization targets can also be predefined by means of different control matrices.

In accordance with one embodiment, the method furthermore comprises a step for calculating a target variable from the ascertained components of the predetermined frequencies of the detected manipulated or measurement variables. Such a target variable can comprise in particular for example a variable which cannot be directly detected metrologically in the electric machine or the drive system. By means of calculating, that is to say deriving, said target variable from further variables which can be detected metrologically in the electric machine or the drive system, it is thus also possible to efficiently ascertain variables that are ascertainable only indirectly. In particular, a further matrix can also be used for calculating the target variable from manipulated or measurement variables, which further matrix can likewise be created beforehand.

In accordance with one embodiment of the electric drive system, the electric machine comprises an asynchronous machine or a permanent magnet synchronous machine.

The above configurations and developments can be combined with one another in any desired way, insofar as is practical. Further embodiments, developments and implementations of the invention also encompass not explicitly mentioned combinations of features of the invention described above or below with regard to the exemplary embodiments. In particular, the person skilled in the art here will also add individual aspects as improvements or supplementations to the respective basic forms of the present invention.

BRIEF DESCRIPTION OF THE DRAWINGS

The present invention is explained in greater detail below on the basis of the exemplary embodiments indicated in the schematic figures of the drawing, in which:

FIG. 3: shows a schematic illustration of a flow diagram such as is taken as a basis for a method for controlling an electric machine in accordance with one embodiment.

DETAILED DESCRIPTION

Figure 1:
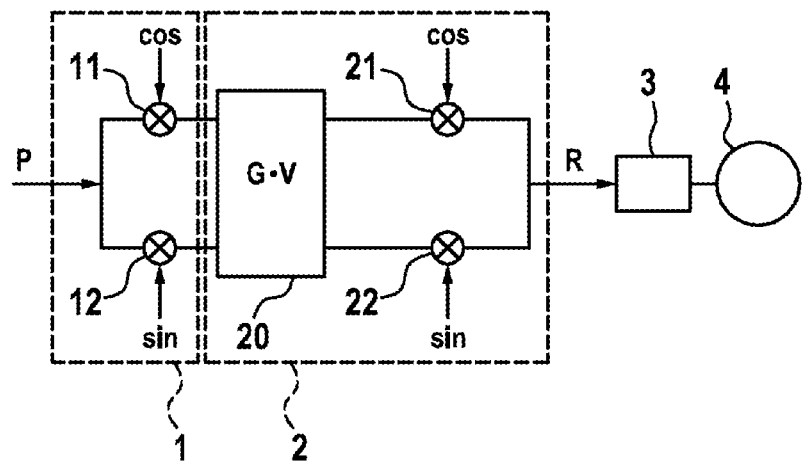
FIG. 1: shows a schematic illustration of an electric drive system comprising a control device for an electric machine in accordance with one embodiment.

FIG. 1 shows a schematic illustration of an electric drive system comprising a control device for an electric machine 4. In this case, the control device comprises a first transformation unit 1 and a first computing unit 2. The controlled variable R calculated in the control device can be provided here to a control unit 3, which drives the electric machine 4 using the calculated controlled variable R.

Any desired manipulated or measurement variables P can be used as input signals for the control device. By way of example, a control voltage of the electric drive system can be utilized as input signal. Furthermore, by way of example, an electric current of the electric machine 4, for example the electric currents in the phase terminals of the electric machine 4, can also be detected and provided as measurement variables. Furthermore, a profile of the torque of the electric machine 4 can also be detected or calculated and utilized as input variable P for the control device. Furthermore, further manipulated or measurement variables are also possible. In particular, by way of example, a predefinition for a defined evolution of noise in the electric machine 4 can also be provided as input variable P. In this regard, by way of example, the evolution of noise in the electric machine 4 can be influenced by oscillations in the torque profile of the electric machine 4. Measurement variables from which further, possibly not directly measurable parameters of the electric machine 4 or of the entire electric drive system can be derived are also possible, moreover. Furthermore, if appropriate, a profile of the electric voltage or of the electric current at the input of a power converter (not illustrated here) of the electric drive system can also be evaluated and concomitantly included in the control of the electric machine 4. In this way, by way of example, perturbations from the electric drive system into a power supply network feeding the drive system can be adapted or minimized.

The manipulated or measurement variables P provided at the control device on the input side are firstly split into predetermined frequency components at the first transformation unit 1. In this case, the component of one predetermined frequency or else the components of a plurality of predetermined frequencies can be extracted for each manipulated or measurement variable P. The predetermined frequencies whose components are extracted from the manipulated or measurement variables can be, in particular, frequencies of harmonics of the electric frequency of the electric machine 4. By way of example, the cosine and sine components of a harmonic to be controlled can be extracted from the time signals of the manipulated or measurement variables P by the signals being demodulated with, that is to say multiplied by, the respective basis functions. This can be done for example by means of the multipliers 11 and 12 in the first transformation unit 1.

For a permanent magnet synchronous machine, by way of example, the present reference angle for the respective harmonic results as $\phi = m \cdot N \cdot \phi\_mech$. In this case, $\phi\_mech$ represents the mechanical rotor position angle, N represents the number of pole pairs and m represents the harmonic order. From the sine component Vs and the cosine component Vc thus calculated, it is possible for example to form a complex vector $V = Vs + jVc$. Furthermore, in principle, however, a purely real-valued implementation is also possible without further limitation. The complex vectors V or the individual sine or cosine components can be combined in a weighting matrix H. A quality functional J can then be formed for the subsequent control:

$$J = V^* H^* H V.$$

Here an asterisk * denotes in each case the transpose complex conjugate element. A minimization of this quality functional J corresponds to a minimization of the harmonic components in the manipulated or measurement variables P. In order to define a different weighting and thus a different importance of individual targets among one another, the weighting matrix H already mentioned above is used. Taking account of a steady-state transfer response in the electric machine 4, the quality functional J can be regarded as a function of the harmonics in the manipulated or measurement variables P of the electric machine 4. On the basis of a gradient-based optimization, the coefficients of the manipulated or measurement variables P for the electric drive system can finally be adapted iteratively such that the quality functional J is minimized. This finally results in the coefficients of the manipulated variables being able to be calculated by simple multiplication of an operating-point-dependent matrix G by the complex vectors of the frequency components of the manipulated or measurement variables. This can be done in the multiplication unit 20, for example. In this case, the complex operating-point-dependent matrix G can already be calculated in advance and therefore does not burden the computing power during the control.

The corresponding multiplication of the operating-point-dependent matrix G by the coefficient vectors V can be carried out in the first computing unit 2, for example.

Finally, a controlled variable R can be formed by modulation with the respective basis functions in the modulators 21 and 22, said controlled variable being fed to the control unit 3. The control unit 3 thereupon drives the electric machine 4 using the controlled variable R formed.

Figure 2:
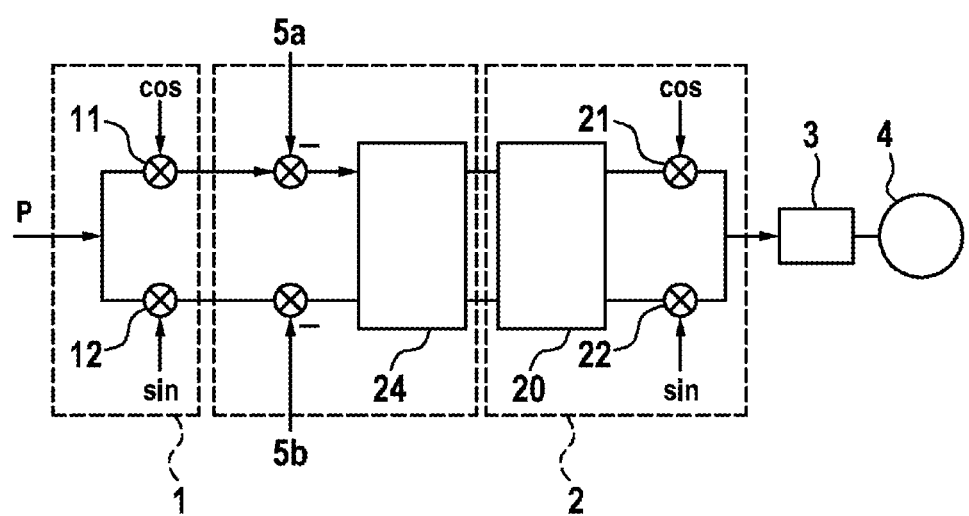
FIG. 2: shows a schematic illustration of an electric drive system comprising a control device for an electric machine in accordance with a further embodiment.

FIG. 2 shows a schematic illustration of a control device for an electric machine 4 in accordance with a further embodiment. This embodiment substantially corresponds to the embodiment described above and has furthermore been extended by a second computing unit 24. In said second computing unit 24, by way of example, parameters of the electric machine 4 or of the entire electric drive system that are not directly detectable metrologically can be derived from the metrologically detected variables. It is thus also possible to realize a control for target values which cannot be ascertained directly in the electric drive system. This calculation of the further parameters of the electric drive system can also be carried out for example by means of a simple multiplication of detected measurement values by a matrix formed previously. This enables particularly simple control of the electric drive system and in particular of the electric machine 4 even for target values which cannot be detected or possibly cannot be detected directly. For setting predefined setpoint values Sa and Sb, these setpoint values Sa and Sb can also be provided as setpoint value predefinitions in the control device.

FIG. 3 shows a schematic illustration of a flow diagram such as is taken as a basis for a method 100 for controlling an electric machine 4 in accordance with one embodiment. Step 110 involves detecting at least one manipulated or measurement variable. Step 120 involves ascertaining predetermined frequency components from said at least one manipulated or measurement variable detected. As already described above, these components can be formed by demodulation with (multiplication by) corresponding basis functions. In principle, furthermore, any desired other methods for extracting frequency components of the manipulated or measurement variables P are also possible. Preferably, but not necessarily, a complex vector can be formed from the extracted frequency components. The frequency components can be, in particular, components of frequencies of predefined harmonics of the electric machine 4.

Step 130 involves calculating a controlled variable using a predetermined control matrix G and the frequency components of the manipulated or measurement variables that were ascertained in step 120. Using this calculated controlled variable, in step 140, the electric machine can thereupon be driven correspondingly.

As has already been explained above, the control matrix G for the control of the electric machine 4 can in this case already be calculated in advance offline and therefore does not burden the computing power of the control system during the operation of the electric machine. In this case, different control matrices G are also possible, if appropriate, for different operating modes of the electric drive system. For this purpose, if necessary, a plurality of different control matrices G can be calculated in advance. They can be stored, if appropriate, in a corresponding storage device. Consequently, during the operation of the electric machine 4, by simply exchanging the control matrix G it is possible to adapt the control behavior of the control for the electric machine. By way of example, different control matrices G can be formed in order to pursue different goals during the control of the electric machine 4. It is thus possible, on the one hand, to minimize harmonics in the torque profile of the electric machine 4. Such a minimization of the fluctuations in the torque profile of the electric machine results in particularly quiet running of the electric machine.

If appropriate, it may be desirable deliberately to deviate from such an optimized torque profile, in order for example to raise the evolution of noise in the electric machine 4. As a result, it is possible for example to attract the attention of a user or a further person in the vicinity of the electric machine 4. This can make the user aware of possible hazard situations, for example. Furthermore, by way of example, by means of deliberately raising the evolution of noise in the drive in an electric or hybrid vehicle, it is also possible to utilize this evolution of noise to draw the attention of persons in the vicinity of the vehicle to the vehicle.

Furthermore, the perturbation from the electric drive system to a power supply network to which the drive system is connected can for example also be minimized by means of a corresponding control. Furthermore, by means of suitable adaptation of the respective control matrix, not only is it possible to pursue one goal or the other, but it is also possible to pursue a combination of a plurality of goals and in this case to weight the individual target predefinitions accordingly.

To summarize, the present invention relates to a control for an electric machine. For the control of the electric machine, predetermined frequency components are extracted from manipulated or measurement variables of the electric machine and are multiplied by a previously calculated control matrix. The control matrix can be calculated in advance in this case. Different control matrices can be formed in advance for different applications. Simple, efficient and robust control of the electric machine in particular for optimizing and minimizing harmonics is possible as a result.

The invention claimed is:

1. A method (100) for controlling an electric machine (4), the method comprising:
   detecting (110) at least one manipulated or measurement variable (P);
   ascertaining (120) components of a predetermined frequency in the at least one detected manipulated or measurement variable (P);
   selecting a control matrix from a plurality of predetermined control matrices based on a predefined operating mode for the electric machine (4), wherein each of the predetermined control matrices corresponds to a different predefined operating mode of the electric machine (4);
   calculating (130) a controlled variable (R) using the ascertained components of the predetermined frequency of the detected manipulated or measurement variable (P) and the selected control matrix; and
   adjusting a torque profile of the electric machine (4) by adjusting an operational parameter of the electric machine (4) according to the calculated controlled variable (R).

2. The method (100) as claimed in claim 1, wherein the at least one manipulated or measurement variable (P) comprises a torque of the electric machine (4).

3. The method (100) as claimed in claim 1, wherein the step for calculating the controlled variable (R) comprises a transformation of the controlled variable (R) into the time domain.

4. The method (100) as claimed in claim 1 further comprising calculating a target variable from the ascertained components of the predetermined frequency of the detected manipulated or measurement variable (P).

5. The method as claimed in claim 1, wherein the at least one manipulated or measurement variable (P) comprises at least one selected from the group consisting of an electric current into the electric machine (4), an evolution of noise in the electric machine (4), and a control voltage of the electric machine (4).

6. A controller for an electric machine (4), the controller being configured to:
   ascertain components of a predetermined frequency from at least one manipulated or measurement variable (P);
   selecting a control matrix from a plurality of predetermined control matrices based on a predefined operating mode for the electric machine (4), wherein each of the predetermined control matrices corresponds to a different predefined operating mode of the electric machine (4);
   calculate a controlled variable (R) using the selected control matrix and the ascertained components of the predetermined frequency of the manipulated or measurement variable (P); and
   adjust a torque profile of the electric machine (4) by adjusting an operational parameter of the electric machine (4) according to the calculated controlled variable (R).

7. The controller as claimed in claim 6, comprising a control unit (3) designed to drive the electric machine (4) using the calculated controlled variable (R).

8. The controller as claimed in claim 6, wherein the controller is further configured to calculate a target variable from the ascertained components of the predetermined frequency of the detected manipulated or measurement variable (P).

9. An electric drive system comprising:
   an electric machine (4); and
   a control device as claimed in claim 6.

10. The controller as claimed in claim 6, wherein the at least one manipulated or measurement variable (P) comprises at least one selected from the group consisting of an electric current into the electric machine (4), an evolution of noise in the electric machine (4), and a control voltage of the electric machine (4).

* * * * *